Figure 1:
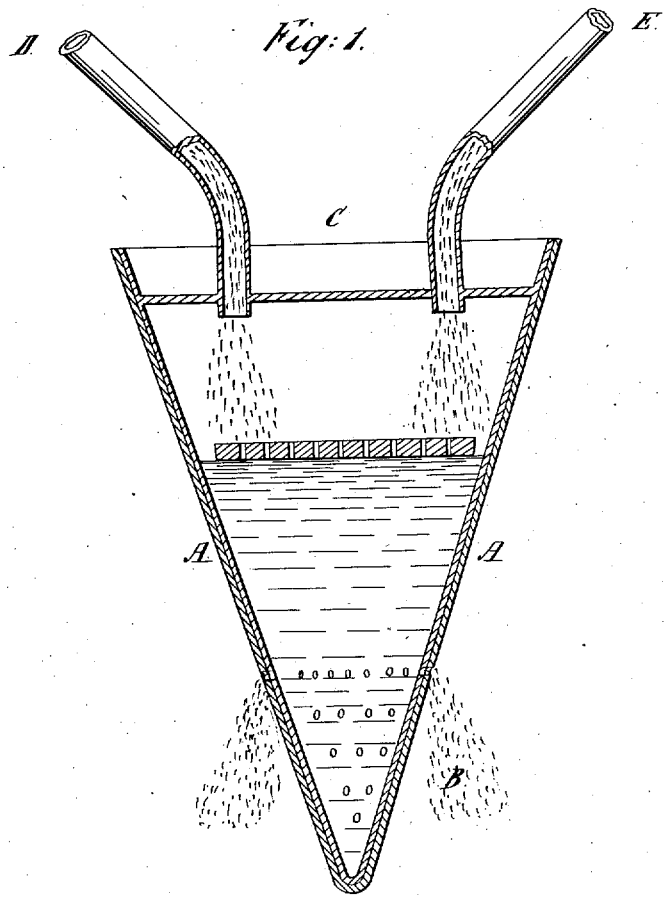
Figure 1:
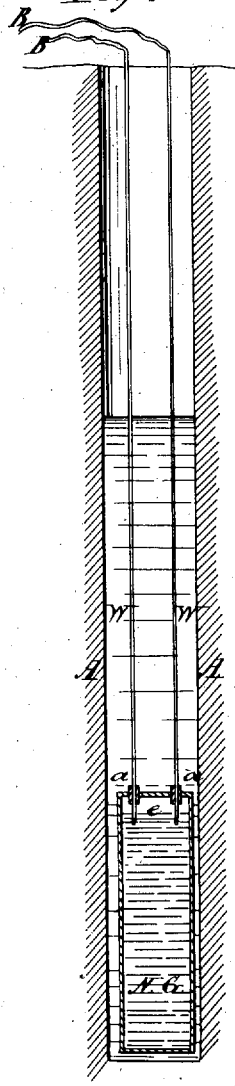

Sheet 1 - 2 Sheets.

A. Nobel.

Exploding Nitro-Glycerine.

No. 3,378. Reissued Apr. 13, 1869.

Witnesses
Chas C Wilson
J. E. M. Powlo

Inventor
Alfred Nobel

Sheet 2-2 Sheets

A. Nobel.

Exploding Nitro-Glycerine.

No. 3,378. Reissued Apr. 13, 1869.

Witnesses
Chas Wilson
J.E.M. Bowlo

Inventor
Alfred Nobel

UNITED STATES PATENT OFFICE.

THE UNITED STATES BLASTING-OIL COMPANY, OF NEW YORK, N. Y., ASSIGNEE OF ALFRED NOBEL.

IMPROVED MODE OF EXPLODING NITRO-GLYCERINE.

Specification forming part of Letters Patent No. 50,617, dated October 24, 1865; reissue No. 3,378, dated April 13, 1869.

DIVISION B.

*To all whom it may concern:*

Be it known that ALFRED NOBEL, of the city of Hamburg, Germany, has discovered or invented a new and useful improvement in the sciences and arts pertaining to the use and manufacture of nitro-glycerine, this specification having special reference to Improvements in Devices for Exploding Nitro-Glycerine.

The said NOBEL does not claim to have discovered or invented nitro-glycerine, as that was due to Sobrero. After the simple discovery and chemical analysis that glycerine was capable of giving, when mixed with nitric and sulphuric acids, a substance analogous to gun-cotton, Sobrero abandoned further research, with the declared opinion that its combustion or explosion could not be managed. In this condition the discovery or invention remained utterly useless to men of science and to artisans until the discoveries and inventions of NOBEL brought it into practical service in the useful arts. He discovered, first, that in order to explode the whole, or even a large proportion, of a mass of nitro-glycerine, it was necessary to subject it to confinement or restraint, and that when so confined it could be exploded in any desired quantity by the application of heat and pressure, or of either of those agencies; second, that it could be used for practical blasting, and disrupting material substances generally.

And the said NOBEL invented, first, a method of manufacturing nitro-glycerine in any desired quantity, and with greater economy than hitherto known; second, the appliances or contrivances necessary to successfully explode nitro-glycerine, in any desired quantity, under the management of miners, or men of practical intelligence.

We now proceed to make a clear and concise description of the said discoveries and inventions of the said NOBEL, in order to enable others skilled in the sciences and arts to which they belong to make use of and understand the same.

First, that nitro-glycerine, when under conditions of confinement, can be exploded in any desired quantity.

There is a class of explosive substances, comprising nitro-glycerine, the nitrates of ethyl and methyl, and nitro-mannite, which have long been known, but have never been practically applied as explosive agents. When 578° Fahrenheit of heat is applied to granulated gunpowder, the whole mass is exploded. Gun-cotton will explode in proportion to the degree of confinement, igniting at 266° Fahrenheit. Fulminates ordinarily used in percussion-caps will explode when subjected to 340° Fahrenheit. Nitro-glycerine will explode at 360° Fahrenheit. The decomposition of the above and other analogous substances, however, takes place at a much lower temperature when subjected to pressure.

Gunpowder will explode to a certain extent when not confined; but on the application of heat or flame to nitro-glycerine, or other of the liquids above mentioned, when unconfined, only that portion of the liquid is decomposed which is acted on directly by the heat or flame, so that it is practically impossible instantaneously to explode the entire mass. NOBEL discovered that when nitro-glycerine, mannite, or other of the materials mentioned, is confined, and a portion of the same is heated to decomposition, the gases evolved are at such an intense heat, and subject the material to such an excessive pressure, that the whole mass is decomposed almost instantaneously.

The degree of confinement must be sufficient to allow a pressure upon the nitro-glycerine to an extent that 300° Fahrenheit will be realized, or to hold it in the presence of a percussion-cap, or other highly explosive agent, so that decomposition will take place before the liquid can escape the force or heat of the evolved gases of the said cap, &c. In this manner, and by other methods, NOBEL discovered or invented that nitro-glycerine could be exploded in any desired quantity.

Second, that nitro-glycerine could be used for practical blasting, and disruption of material substances generally.

Having discovered that nitro-glycerine could be exploded in any desired quantity, at the will of the manipulator, NOBEL then proceeded to adapt it to the useful arts, such as blasting rock, earth, and material substances generally.

To effect this object he invented the mode or method hereinafter described, in substance as follows: Placing the nitro-glycerine in a drill-hole or canister, and then exploding in the midst of the said nitro-glycerine a charge of gunpowder, gun-cotton, or injecting an electric flame into the mass of nitro-glycerine, or the heating to red heat of a metallic wire placed within the nitro-glycerine, the necessary heat will be effective in the decomposition of an atom or more of the nitro-glycerine when confined, which will cause the explosion of the whole mass.

Third, he invented a method of manufacturing nitro-glycerine in any desired quantity, and with greater economy than hitherto realized.

Chemical works describe the mode of manufacturing to be drop by drop of the component parts necessary to compound nitro-glycerine, which in practice has been found to be expensive. NOBEL invented a process by which the parts could be more rapidly mixed.

NOBEL'S improved mode of manufacturing nitro-glycerine consists in adding the glycerine to a mixture of sulphuric and nitric acids by pouring them together into a funnel, and discharging the mixture or nitro-glycerine thus made from the funnel into a body of cold water, kept at a low temperature by any suitable means. The nitro-glycerine, being insoluble in water, quickly separates, and is easily removed therefrom.

The apparatus employed by NOBEL in the practical application of his new mode of manufacturing nitro-glycerine is shown in the drawing accompanying this specification, in Plate 1, Figure 1, which represents a funnel-shaped vessel, made of stone, lead, or other suitable material.

A is the vessel; B, perforations through the vessel. C is a cover, and D and E are tubes connected with reservoir-tanks of sufficient elevation to allow the influence of gravitation and atmospheric pressure to force the liquids contained to descend in such manner that they will mingle or mix before they reach the water in which the said vessel is placed. There may be perforated disks in the said funnel-shaped vessel, placed so that the liquids will have additional opportunity to mix before they reach the water. The glycerine being thus mixed with the acids, nitro-glycerine will be formed, which, when in the water, separates from the acids.

The glycerine should enter the vessel through the pipe D, and the acids (one part nitric acid, say 48° Baumé specific gravity, and two parts sulphuric acid, say 66° Baumé specific gravity) through the other pipe, E. When nitric acid of a high specific gravity, say 48° Baumé, is used, the temperature is much increased by the reaction. It is, therefore, better to introduce the nitric acid and glycerine gradually into the sulphuric acid, allowing the mixture to cool between each operation. By preference, he introduces the nitric acid and glycerine a few moments, and then, waiting a short time for the mixture to cool, repeats the operation.

Second, the appliances or contrivances necessary to successively and practically explode or decompose nitro-glycerine in any desired quantity, under the management of miners, or men of practical intelligence.

The processes or contrivances invented by NOBEL for exploding nitro-glycerine, &c., are of several kinds, all and each calculated to produce the required heat or percussion.

First, by an electric spark, or current of electricity, illustrated and explained as follows:

Plate 2, Fig. 1, is a sectional view of the drill-hole, canister, or vessel containing the nitro-glycerine, marked N G. A A represent the walls or sides of the drill-hole or vessel. B B are wires leading from an electric battery. *e* is a small platina wire. *a a* are holes through the cover of the vessel, or may be considered through the tamping in the drill-hole.

When the wires B B are connected with an electric battery, or any known generator of electricity, the small platina wire *e* becomes heated to a red heat, being about 800° Fahrenheit, more or less, depending upon the strength of the electric current.

This mode of making a wire red hot is well known in the sciences to which it belongs, and we do not limit ourselves to any particular battery. This, however, may represent a voltaic or magneto battery; but the fire may be produced by a static machine, generating a flame of high degree of heat, flashing from the ends of B B across at *e*. This wire or flame, passing through the nitro-glycerine, produces decomposition of the nitro-glycerine, and, the evolution of the gases being of a great degree of heat, the whole mass is instantaneously decomposed or exploded.

Secondly, by exploding a quantity of gunpowder or other substance in contact with the liquid, (the powder being confined in a waterproof tube or case,) the heated gases evolved from the powder, being distributed throughout the mass of liquid, raise the temperature of the latter sufficiently to decompose the same. When powder is used for this purpose, the case containing it may be immersed in the liquid, the powder being ignited by means of a fuse, or by an electric spark. If desirable, however, the liquid may be placed in a tube, and inserted in a mass of powder, which is then ignited in any suitable manner.

Figure 2:
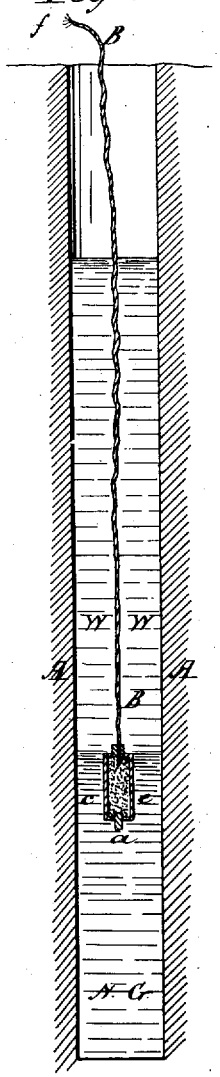

Fig. 2 represents a drill-hole in a rock or a cartridge; A A, the walls of the hole. B B is a fuse, (commonly called a train or powder fuse.) C C is a fusee, being a small wooden plug hollowed, or a tin tube with orifice at *a*, in which is placed a cork or stopper. *e* is gunpowder, gun-cotton, or other explosive substance. N G is the nitro-glycerine. W W is water.

The operation of exploding the nitro-glycerine with this arrangement will be as follows: The fuse B B is ignited at *f*, and the fire is conducted to the gunpowder in the fusee C C, which then explodes, bursting the plug, tube, or vessel, or shooting the cork or stopper from the orifice, which allows the heat to enter into the nitro-glycerine. The gases thus evolved, either by heat or percussion, explode or decompose the nitro-glycerine instantaneously. The water W W serves as a tamping, and prevents the gunpowder from kicking or forcing the fusee from the nitro-glycerine, thus confining the gas evolved by the explosion of the gunpowder in the midst of the nitro-glycerine.

Figure 4:
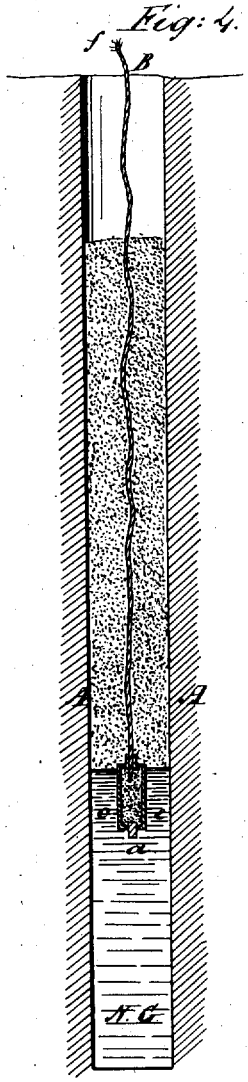

Fig. 4 is an arrangement similar to Fig. 2, the only difference being in tamping. In this figure the tamping is sand or other material.

Figure 3:
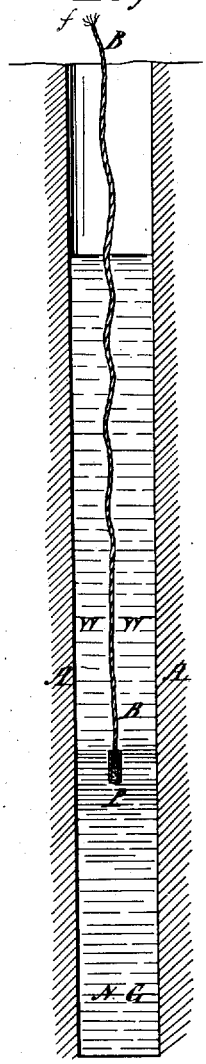

Fig. 3 represents similar arrangements illustrated by Figs. 2 and 4, except that the fuse B B has attached to it a percussion-cap, P, which, when exploded, evolves the required gases that produce the decomposition or explosion of the nitro-glycerine in which it is immersed. B B is the fuse; P, percussion-cap; N G, nitro-glycerine; W W, water tamping; A A, walls of the drill-hole.

Thirdly, the nitro-glycerine placed in a drill-hole or canister (represented by Figs. 1, 2, 3, or 4) may be exploded by a train-fuse of fulminate powder or composition. For example, the ordinary fulminate powder used in percussion-caps may be put in a tube or casing of fiber or gutta-percha, and made to fire, explode, or spit into the nitro-glycerine. This will do in a closed space and under sufficient pressure; but if the gases of the decomposed liquid are enabled to escape before they accumulate to such a pressure as to effect the requisite impulses of explosion, the liquid is decomposed but slowly, and the fire expires before the whole mass is consumed.

Fourthly, by inserting in the liquid a thin case containing lime and water, or any substances which, when combining, evolve heat; also, by the liberation of substances or matter, either with the nitro-glycerine, in the presence of the nitro-glycerine, or in the midst of nitro-glycerine, by which process or processes mixing, engaging, or forming gases may be evolved of sufficient heat to produce decomposition or explosion of the nitro-glycerine.

Having thus fully described the discoveries and inventions of the said ALFRED NOBEL with sufficient clearness and distinctness to enable others skilled in the sciences and arts to which they belong to make and use the same, what we claim as the discoveries or inventions of the said NOBEL, and desire to secure by Letters Patent, in the name of the United States Blasting-Oil Company aforesaid, as the assignee of the said NOBEL, is as follows:

1. The decomposition or explosion of nitro-glycerine, when under confinement, as hereinbefore described, by means of heat generated within the mass of nitro-glycerine through the agency of an electric spark, or of a voltaic, magnetic-electric, or static-electric current, however generated, substantially as and for the purposes hereinbefore set forth.

2. The decomposition or explosion of nitro-glycerine, when under restraint or confinement, as hereinbefore described, by the evolution or generation of heated gas or gases, and the consequent production of heat and pressure within or upon the fluid mass of nitro-glycerine, by means of the explosion of gunpowder or other, equivalent explosive or fulminating substance, under or upon the surface of the nitro-glycerine, substantially as and for the purposes hereinbefore set forth.

3. The use and application of the plug of wood, metal, or other suitable material, for holding or containing gunpowder, or other explosive substance, within, upon, or near to the fluid mass of confined nitro-glycerine, together with the parts and arrangements of such plug, in the manner and substantially as hereinbefore described.

4. The application and use of a percussion-cap, fitted to a train or other fuse used for conducting fire, when used in connection with nitro-glycerine, so that the said cap, evolving on its explosion the required heated gases, or the forces of percussion or concussion, shall decompose or explode nitro-glycerine, when under confinement, in the manner and substantially as hereinbefore described.

5. The application and use, within the fluid mass of nitro-glycerine, subjected to confinement, as hereinbefore described, of lime and water, or other substances which will, on combining under similar circumstances, generate a sufficient degree of heat, for the purpose of decomposing or exploding nitro-glycerine by means of heat generated within it, substantially as hereinbefore described.

TAL. P. SHAFFNER.
JAMES DEVEAU.

Witnesses:
CHAS. C. WILSON,
J. E. M. BOWEN.